US011273720B2

(12) United States Patent
Elshaer et al.

(10) Patent No.: US 11,273,720 B2
(45) Date of Patent: Mar. 15, 2022

(54) SYSTEM AND METHOD FOR MULTI-SOURCE WIRELESS AND CONDUCTIVE CHARGING

(71) Applicant: FORD GLOBAL TECHNOLOGIES, LLC, Dearborn, MI (US)

(72) Inventors: Mohamed Elshaer, Canton, MI (US); Chingchi Chen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 57 days.

(21) Appl. No.: 16/587,230

(22) Filed: Sep. 30, 2019

(65) Prior Publication Data

US 2021/0094426 A1 Apr. 1, 2021

(51) Int. Cl.
| | |
|---|---|
| *B60L 53/122* | (2019.01) |
| *H02J 7/02* | (2016.01) |
| *H02M 1/42* | (2007.01) |
| *H02J 50/12* | (2016.01) |
| *H02M 7/06* | (2006.01) |
| *B60L 53/22* | (2019.01) |
| *B60L 53/16* | (2019.01) |
| *B60L 53/18* | (2019.01) |
| *H02M 3/335* | (2006.01) |
| *H02J 7/00* | (2006.01) |

(52) U.S. Cl.
CPC ............ *B60L 53/122* (2019.02); *B60L 53/16* (2019.02); *B60L 53/18* (2019.02); *B60L 53/22* (2019.02); *H02J 7/00* (2013.01); *H02J 7/025* (2013.01); *H02J 50/12* (2016.02); *H02M 1/42* (2013.01); *H02M 3/33553* (2013.01); *H02M 7/06* (2013.01); *B60L 2210/10* (2013.01); *H02J 2207/20* (2020.01)

(58) Field of Classification Search
CPC ........ B60L 53/122; B60L 53/16; B60L 53/18; B60L 53/22; B60L 2210/10; B60L 53/12; H02J 7/00; H02J 7/025; H02J 50/12; H02J 2207/20; H02J 2310/48; H02J 7/02; H02M 1/42; H02M 7/06; H02M 3/33553; H02M 1/0058; H02M 1/007; H02M 1/0077; H02M 3/3376; H02M 1/4208; Y02T 10/70; Y02T 10/7072; Y02T 10/72; Y02T 90/14
USPC ........................................................ 320/108
See application file for complete search history.

(56) References Cited

U.S. PATENT DOCUMENTS

| | | | |
|---|---|---|---|
| 9,381,821 B2 | 7/2016 | Keeling et al. | |
| 2014/0340027 A1* | 11/2014 | Keeling ................ | B60L 53/122 320/108 |

* cited by examiner

*Primary Examiner* — Paul Dinh
(74) *Attorney, Agent, or Firm* — David B Kelley; Brooks Kushman P.C.

(57) ABSTRACT

A charger system and method is disclosed for providing wireless and wired charging. The charger may include a wire-charging circuit operable to receive and process a first electrical energy from a wired power source directly connected to the vehicle. The charger may also include a receiving coil operable to receive a second electrical energy received from a wireless power source external that is not directly connected to the vehicle. The charger may include a resonant circuit having a receiving coil and a DC-DC converter. The receiving coil may provide impedance matching when the charger is receiving the first electrical energy from the wired power source. The receiving coil may also be energized by a wireless power source to receive a second electrical energy. The charger may further include a rectifier circuit operable to charge the battery using the first electrical energy or the second electrical energy.

19 Claims, 11 Drawing Sheets

SYSTEM AND METHOD FOR MULTI-SOURCE WIRELESS AND CONDUCTIVE CHARGING

TECHNICAL FIELD

The present disclosure relates to a system and method for on-board charging one or more high-voltage batteries used within an electric vehicle, plug-in hybrid electric vehicle, or hybrid-electric vehicle.

BACKGROUND

Vehicles such as battery-electric vehicles (EVs), plug-in hybrid electric vehicles (PHEVs) and fully hybrid-electric vehicles (FHEVs) contain a high-voltage traction battery assembly to act as an energy source for one or more electric machines. The traction battery includes components and systems to assist in managing vehicle performance and operations. Generally, EVs or PHEVs may be configured to receive a charge through both a wired power supply and a wireless power supply. Various dual-source charging systems can provide wired and wireless power either alternately or simultaneously to an electric vehicle. Dual-source charging systems generally require separate electrical circuitry to provide wired and wireless charging capabilities. The additional circuitry increases packaging space and increases the cost of the charging system.

SUMMARY

In one embodiment, a system and method is disclosed for a charger that may be operable to provide wireless charging and wired (i.e., conductive) charging to a battery of a vehicle. The charger may be an on-board charger positioned within an electric or hybrid vehicle. The charger may include a wire-charging circuit including a power factor correction circuit, a capacitor, and an inverter. The wire-charging circuit may be operable to receive and process a first electrical energy from a wired power source directly connected to the vehicle. The wired power source providing the first electrical energy may comprise an electric vehicle supply equipment charging connection, an AC outlet, or a battery pack.

The charger may include a resonant circuit connected to the wire-charging circuit. The resonant circuit may include a receiving coil and a DC-DC converter. The receiving coil may provide impedance matching when the charger is receiving the first electrical energy from the wired power source. The receiving coil may also be energized by a wireless power source external to the vehicle to receive a second electrical energy when the resonant circuit is not receiving the first electrical energy from the wired power source. The charger may further include a rectifier circuit operable to charge the battery using the first electrical energy or the second electrical energy.

It is contemplated that the receiving coil may receive the second electrical energy from a wireless transmission circuit that is external to the vehicle. The wireless transmission circuit may comprise a power factor correction circuit, a capacitor, an inverter, and a wireless transmitting coil. The wireless transmitting coil may be operable to wirelessly transmit the second electrical energy to the wireless receiving coil.

It is also contemplated that the DC-DC converter may include a primary winding, a first secondary winding, and a second secondary winding. It is contemplated that the charger may include one or more jumper switches that may be operable to modify the configuration of the DC-DC converter and the rectifier circuit to provide different levels of charging voltages to the battery. For instance, the first secondary winding and the second secondary winding may be parallelly connected to the rectifier circuit to provide DC charging voltage to the battery. The rectifier circuit may also include a first diode set and a second diode set that may be mutually connected to a smoothing capacitor to provide 400-Volts of DC charging voltage to the battery. Alternatively, the rectifier circuit may include a first diode set that may be connected to a first smoothing capacitor and a second diode set that may be connected to a second smoothing capacitor. The output of the first smoothing capacitor and the second smoothing capacitor may operate to provide 800-Volts of DC charging voltage to the battery. Or the first secondary winding and the second secondary winding are serially connected to the rectifier circuit so as to be operable to provide 800-Volts of DC charging voltage to the battery. It is further contemplated that the first secondary winding and the second secondary winding may also be magnetically decoupled from the primary winding so as to provide uniform volt-amp stress across the wire-charging circuit.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
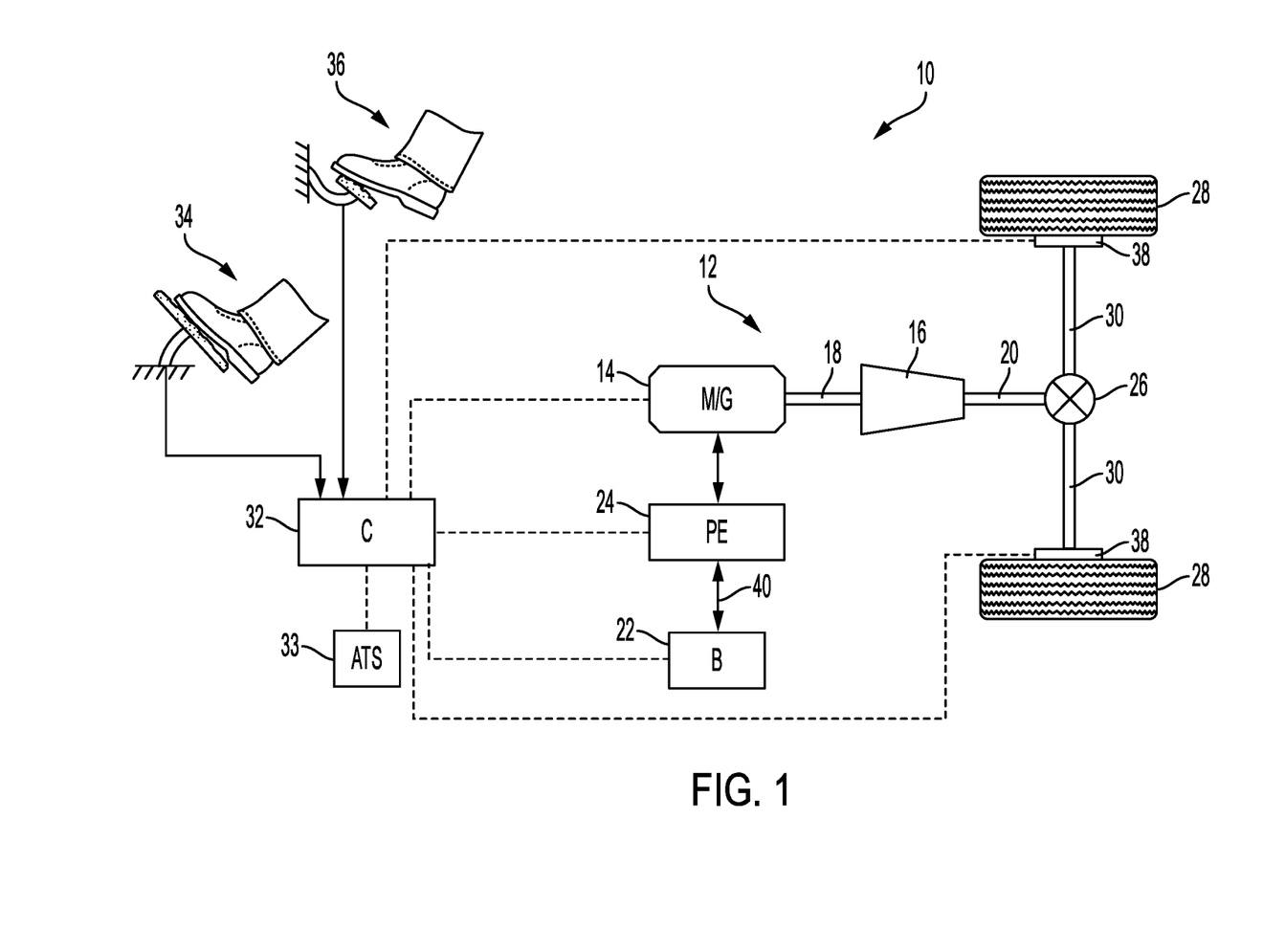
FIG. 1 illustrates an exemplary topology of an electric vehicle.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an M/G 14 (i.e., electric motor/generator) that drives a transmission 16 (or gearbox). More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated battery 22 (i.e., high voltage battery) is configured to deliver electrical power to or receive electrical power from the M/G 14. Depending upon the type of electric vehicle 10, the size of the battery 22 may vary. For instance, the electric vehicle 10 may be configured such that the battery 22 may be sized to provide 400-Volts or 800-Volts.

The M/G 14 is a drive source for the electric vehicle 10 that is configured to propel the electric vehicle 10. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the output shaft 20 and the input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the operating mode or condition.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the controller 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission 16 or any other clutch that is part of the powertrain 12, and the like. Sensors communicating input through the I/O interface may be used to indicate wheel speeds (WS1, WS2), vehicle speed (VSS), coolant temperature (ECT), accelerator pedal position (PPS), ignition switch position (IGN), ambient air temperature (e.g., ambient air temperature sensor 33), transmission gear, ratio, or mode, transmission oil temperature (TOT), transmission input and output speed, slowing or shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular strategy being used. Similarly, the order of processing is not necessarily required to achieve the features and advantages described within this specification but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the application. When implemented in software, the control logic may be provided in one or more computer-readable storage devices or media having stored data representing code or instructions executed by a computer to control the vehicle or its subsystems. The computer-readable storage devices or media may include one or more known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or decreased power, respectively. A brake pedal 36 is also used by the driver of the vehicle to provide a demanded braking torque to slow the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The controller 32 also controls the timing of gear shifts within the transmission 16.

The M/G 14 may act as a motor and provide a driving force for the powertrain 12. To drive the vehicle with the M/G 14 the battery 22 transmits stored electrical energy through wiring 40 to the power electronics 24 that may include an inverter, for example. The power electronics 24 convert DC voltage from the battery 22 into AC voltage to be used by the M/G 14. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22.

It is contemplated that the schematic illustrated in FIG. 1 is merely representative and is not intended to be limiting. Other configurations are contemplated without deviating from the scope of the disclosure. It is also contemplated that the vehicle configuration described is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas-powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component concentration or presence, intake air flow (MAF), etc.

Figure 2A:
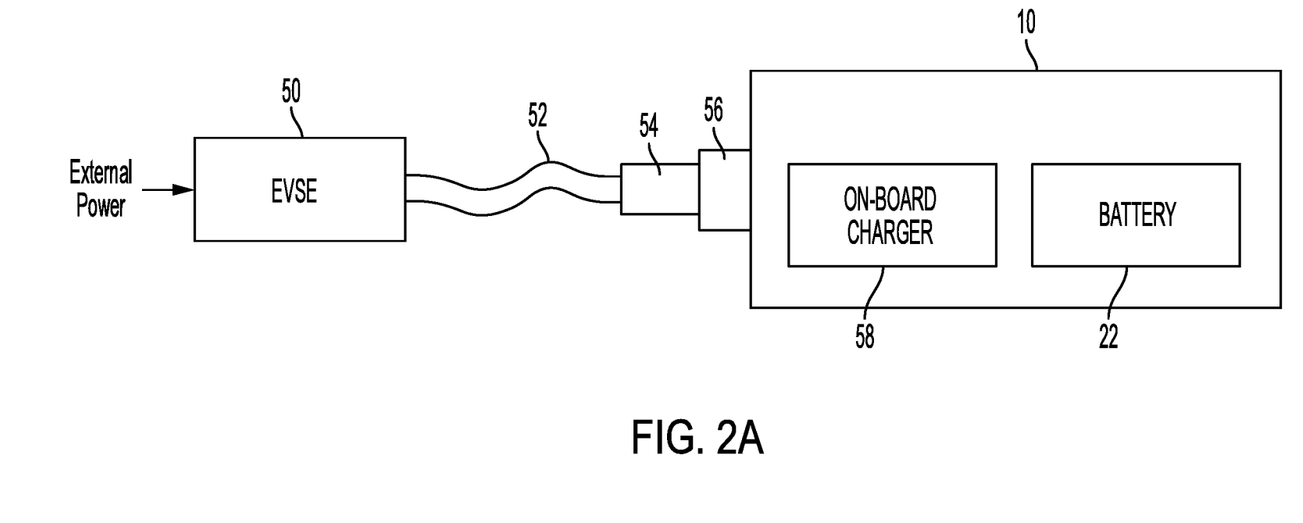
FIGS. 2A and 2B illustrate exemplary topologies of a charging system for the electric vehicle.

FIG. 2A illustrates an arrangement for charging the battery 22 from an external power source (e.g., AC outlet, battery pack, generator). The external power source may be an electrical power distribution network or grid as provided by an electric utility company. As shown, the external power source may be electrically coupled to a charger or EVSE 50 (i.e., electric vehicle supply equipment). Although the EVSE 50 is shown external to electric vehicle 10, it is also contemplated that EVSE 50 may be located within electric vehicle 10.

The EVSE 50 may receive and transfer the received electrical power through a cord 52 and connector 54 that plugs into a mating of the inlet 56 on the electric vehicle 10. As one example, the external power may be AC power received an outlet that is converted to DC power by an on-board charger 58 located within the electric vehicle 10. The on-board charger 58 may then operate to charge the battery 22. Alternatively, the on-board charger 58 may be located in the EVSE 50 external to the electric vehicle 10.

It is contemplated that the EVSE 50 may be realized in different mechanical configurations including a vehicle charger, a charging station, or a charger. It is also contemplated that the EVSE 50 may be installed as wall-mounted units in a garage or alongside a building where vehicles typically park. The EVSE 50 may be a cord set which is sometimes referred to as a travel charger, portable charger, or handheld charger.

The connector 54 and inlet 56 may utilize a conductive connection in which the electrical conductors in one connector make physical contact with the electrical conductors in the other connector. However, it is also contemplated that a wireless power transfer (WPT) system may be employed where a transmitter may provide electric power to a receiver without the use of physical electrical conductors (e.g., power may be transferred through free space). It is contemplated that the power output into a wireless field (e.g., magnetic induction, electric induction, etc.) may be received, captured by, or coupled by a "receiving coil" to achieve the power transfer.

Figure 2B:
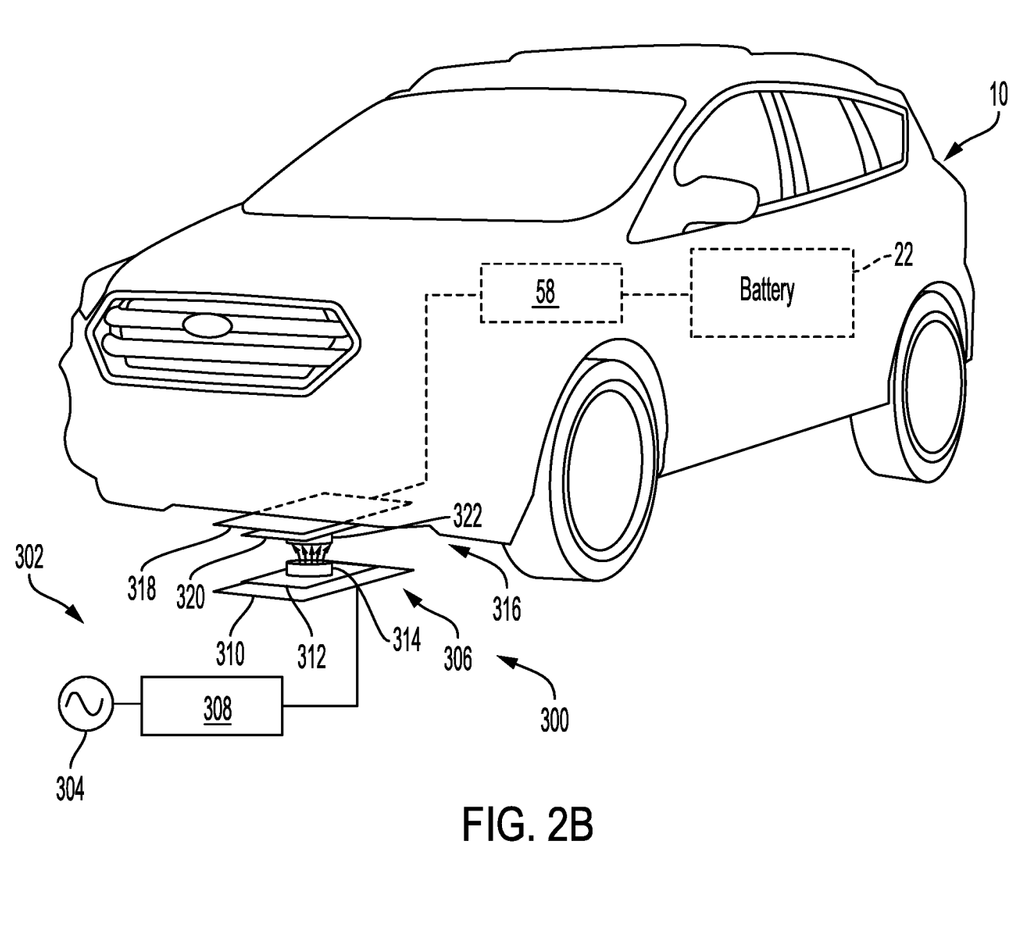

FIG. 2B illustrates a WPT system 300 (i.e., wireless power transfer system) in accordance with one or more embodiments. The WPT system 300 may also include on-board charger 58 that is operable to charge the battery 22 within the electric vehicle 10. An external charging subsystem 302 may include a power source 304 and a ground coil assembly 306. The power source 304 may represent a conventional alternating current (AC) electrical power distribution network or grid as provided by an electric utility company, according to one or more embodiments. An external circuit 308 may connect the power source 304 to the ground coil assembly 306, and includes components for conditioning (e.g., rectifying, inverting, converting and storing) the power signal that is provided to the ground coil assembly 306. The ground coil assembly 306 may include a plate 310 that is mounted to an underlying surface, e.g., a garage floor, and typically formed of aluminum. The ground coil assembly 306 may also include an inductor with a core 312 and a primary coil 314 (i.e., transmitter coil).

A vehicle coil assembly 316 may be mounted to the electric vehicle 10, and the on-board charger 58 may operate to condition (e.g., rectify and convert) the power that is provided to the battery 22. The vehicle coil assembly 316 may also include a plate 318 that is mounted to an underside of the electric vehicle 10, and typically formed of aluminum. The vehicle coil assembly 316 may also includes an inductor with a core 320 and a coil 322 (i.e., secondary or receiver coil).

The vehicle coil assembly 316 may align with the ground coil assembly 306 for receiving electrical power. The power source 304 may supply the primary coil 314 with a current which establishes a magnetic field (not shown) about the primary coil 314. The secondary coil 322 may be electromagnetically coupled to the primary coil 314, by aligning the vehicle coil assembly 316 with the ground coil assembly 306, and placing the secondary coil 322 within the magnetic field. This magnetic field induces a current in the secondary coil 322 to wirelessly transfer power for inductively charging the battery 22. Inductive charging does not require physical contact between the primary coil 314 and the secondary coil 322. However, the primary coil 314 and the secondary coil 322 should be generally close in proximity to each other for efficient inductive charging.

It is contemplated that providing conductive and wireless power charging an electric vehicle 10 may typically require separate components. In other words, the on-board charger 58 may require electrical circuitry that handles the conductive (i.e., wired) power charging and separate electrical circuitry to handle the wireless power transfer. Or the electric vehicle 10 may include require one on-board charger to handle the conductive power charging and a separate on-board charger to handle the wireless power transfer. Additionally, the battery 22 may be sized differently depending on the given electric vehicle 10 application. A battery 22 designed to handle 400-Volts may require different electrical circuitry within the on-board charger 58 than a battery 22 designed to handle 800-Volts. As such, the overall cost, electric circuitry, packaging, and space requirements of the on-board charger 58 may fluctuate depending on a given application.

Figure 3:
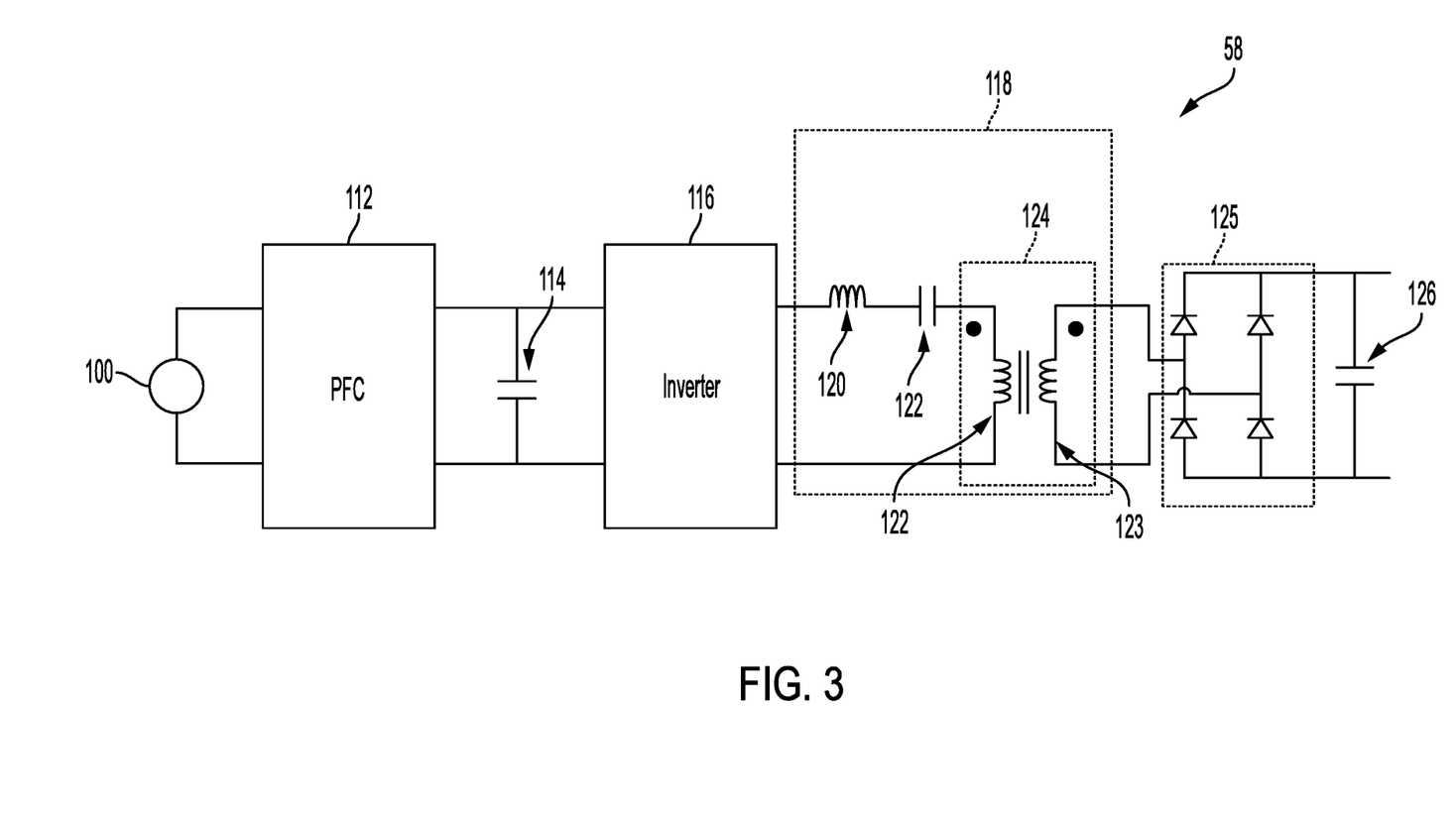
FIG. 3 illustrates the circuit design for an exemplary on-board charger for the electric vehicle.

For instance, FIG. 3 illustrates an on-board charger 58 that may be used to provide conductive power charging. As illustrated, the on-board charger 58 may receive electrical power 100 that is used to charge the battery 22. For conductive charging, the electrical power 100 may be provided by the inlet connector 56 from an A/C power source (e.g., an A/C outlet).

The on-board charger 58 may process the electrical power 100 using a power-factor correction (PFC) circuit 112, a bulk capacitor 114, a low-frequency (LF) inverter circuit 116, a resonant circuit 118, a DC-DC converter 124, a rectifier circuit 125, and a smoothing capacitor 126. The resonant circuit 118 may be designed as an LLC circuit that includes an inductor 120 and capacitor 122 that generally form the resonant (i.e., matching) network. The capacitor 122 may serve to smooth the signal entering the isolated DC-DC converter 124 and to counteract inductive effects of other components.

The DC-DC converter 124 may operate to isolate the battery 22 from the electrical power 100. As illustrated, the DC-DC converter 124 may include a pair of inductive coils 122, 123. It is also contemplated that the DC-DC converter 124 may be configured to adjust a voltage level coming from the wired connection (i.e., electrical power 100), as appropriate for charging the battery 22.

Once power is transferred from the DC-DC converter 124, the on-board charger 58 may also include a rectifier circuit 130 that operates to convert AC power to DC power. A smoothing capacitor 126 may also be used to smooth, or even out, fluctuations in the DC power before being provided to the battery 22.

Figure 4:
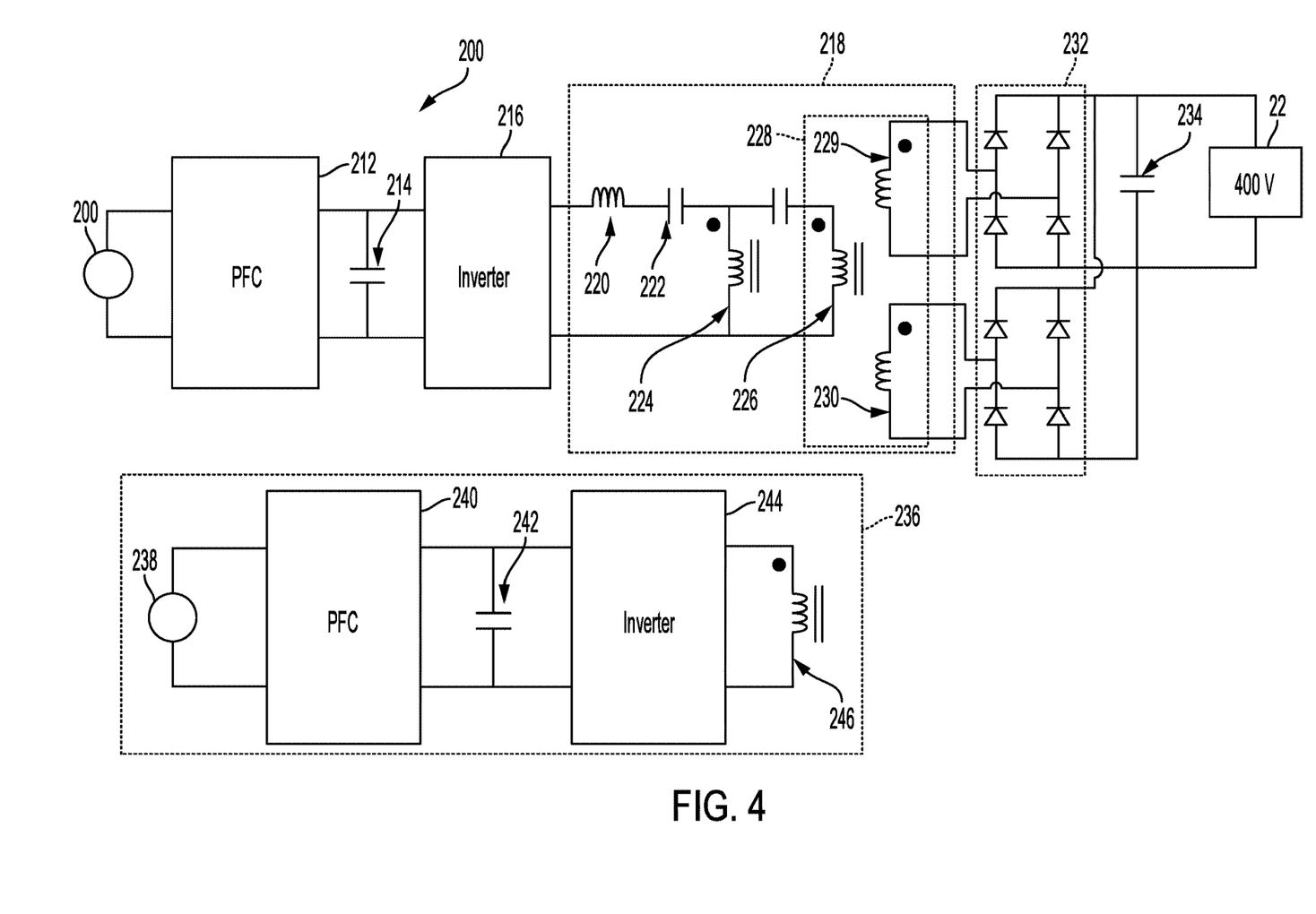
FIG. 4 illustrates an alternative circuit design for an exemplary on-board charger for the electric vehicle.

FIG. 4 illustrates a second embodiment of the on-board charger 200 that is also operable to provide both wired power charging and wireless power charging. As illustrated, the on-board charger 200 may receive conductive power from electrical source 201. The conductive power may then be processed using a power-factor correction (PFC) circuit 212, a bulk capacitor 214, a low-frequency (LF) inverter circuit 216, a resonant circuit 218, a DC-DC converter 228, a rectifier circuit 232, and smoothing capacitor 234.

Again, the resonant circuit 218 may include an inductor 220, capacitor 222, and capacitor 223. The resonant circuit 218 may additionally include receiving coil 224 that may be used to receive electrical power from the wireless power transfer unit 236 that is external to electric vehicle 10 when conductive power is not being supplied by electrical source 201. The wireless power transfer unit 236 may be external to the electric vehicle 10. The wireless power transfer unit 236 may be designed to receive electrical power 238 from an A/C power source. The wireless power transfer unit 236 may then process the electrical power 238 using a wireless PFC circuit 240, a wireless bulk capacitor 242, and a wireless LF inverter circuit 244. A transmitter coil 246 may then wirelessly transfer power to receiving coil 224 to charge the battery 22. It is also contemplated that the DC-DC converter 228 may also be used as part of the resonant circuit 218.

When receiving coil 224 is not being provided wireless charging power from the wireless power transfer unit 236, the receiver coil 224 may be used to provide impedance matching when the on-board charger 200 is being supplied electrical power 201 from a conductive power source. It is also contemplated that by leveraging the large inductance of the receiver coil 224 to optimize the resonant circuit 218, the overall matching network size of the onboard charger may be reduced. It is contemplated that the addition of receiving coil 224 helps form a capacitor-inductor-capacitor (i.e., CLC) resonant circuit where the capacitance between capacitor 222 and capacitor 223 is split proportionally to support dual impedance matching for both the wireless power transfer and conductive power transfer.

It is contemplated that the on-board charger 200 may be designed to support different charging voltages to the battery 22. For instance, the DC-DC converter 228 may be designed such that the secondary windings may be connected in a parallel fashion with respect to rectifier circuit 232. Such a design may operate so that the output of smoothing capacitor 234 provides 400 Volts of charging power to the battery 22.

Figure 5A:
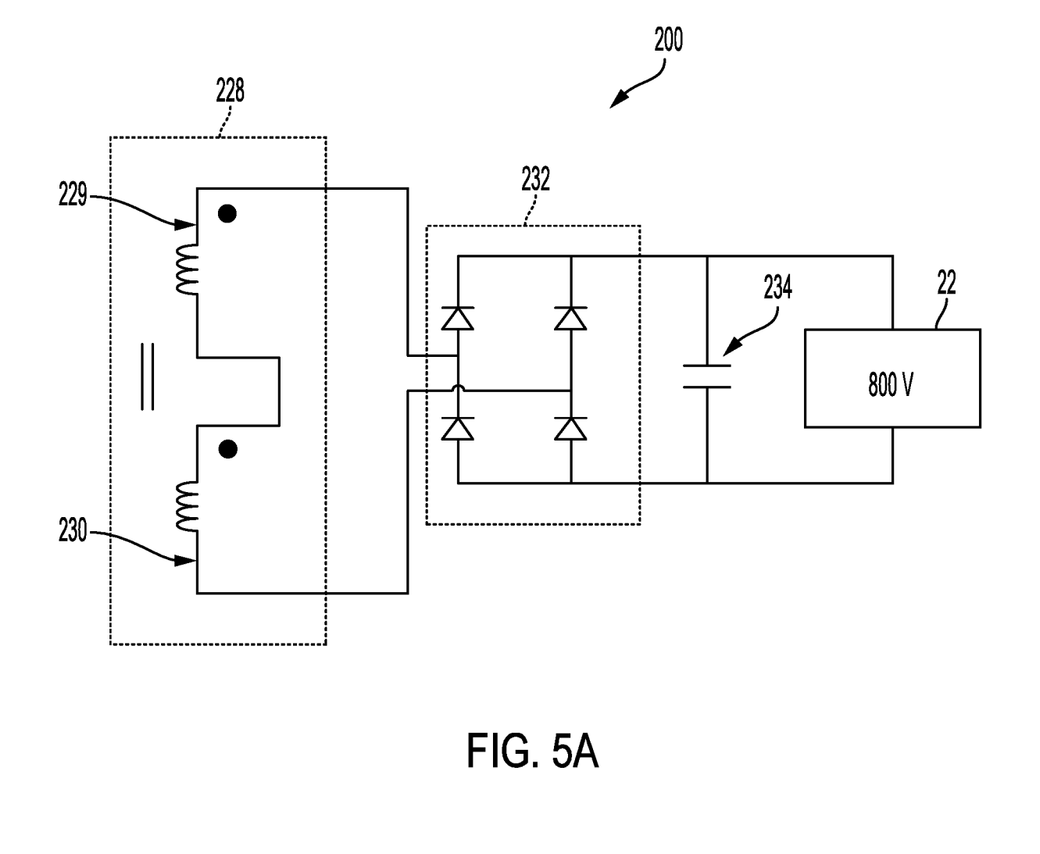
FIGS. 5A and 5B illustrate another alternative circuit design for an exemplary on-board charger for the electric vehicle.
Figure 5B:
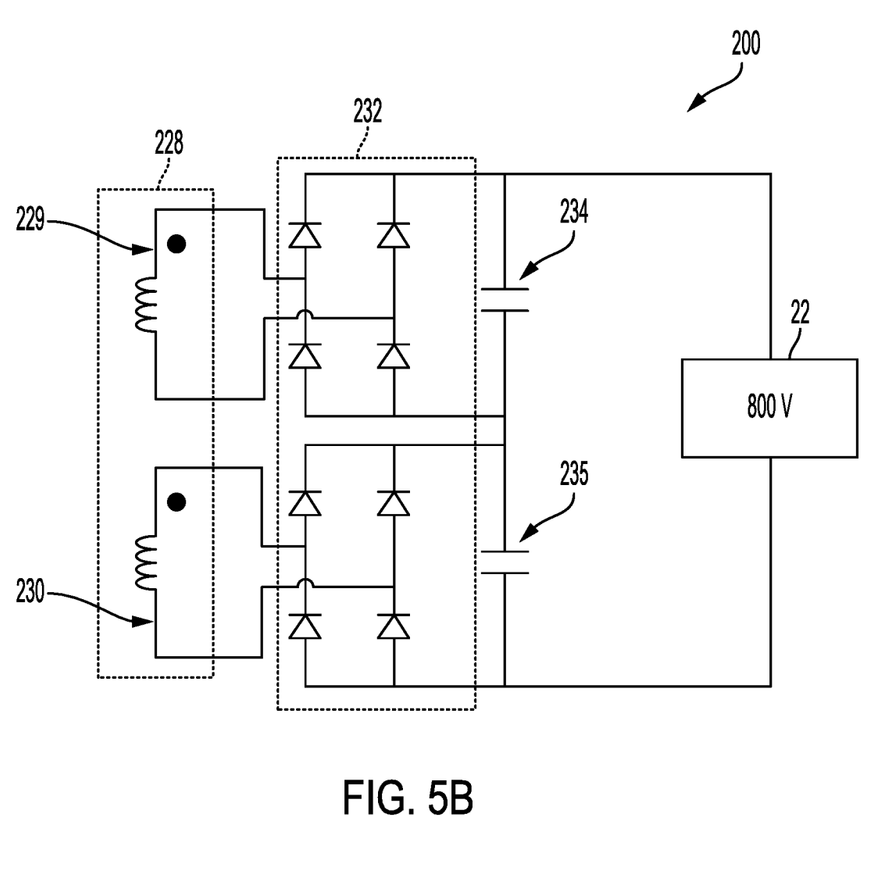

FIGS. 5A and 5B alternatively illustrates how the secondary windings 229, 230 of the DC-DC converter 228 may be configured to support charging a battery 22 sized to be 800-Volts. For instance, FIG. 5A illustrates that the secondary windings 229, 230 may be configured in a series fashion and coupled to rectifier circuit 232. The output of the smoothing capacitor 234 may operate to provide 800-Volts of charging power to the battery 22. FIG. 5B illustrates that secondary winding 229 may be connected to four diodes of the rectifier circuit 232 and secondary winding 230 may be connected to an alternative four diodes of the rectifier circuit 232. The smoothing capacitor 234 and a second smoothing capacitor 235 may operate such that 800 Volts of charging power may be provided to the battery 22.

It is contemplated that the on-board charger 200 may be configured differently to provide alternative charging voltage outputs by modifying jumpers and rectifier diode configurations. For instance, transitioning between the configuration of FIG. 4 and FIG. 5A may be accomplished by using jumpers to configure the secondary windings 229, 230 to be configured in a series fashion and to eliminate four diodes from the rectifier circuit 232. The transition between the configuration of FIG. 4 and FIG. 5B may be accomplished by modifying the output of the rectifier circuit 232 to connect to the second smoothing capacitor 235. It is therefore contemplated that the various circuit topologies may could provide both wired connection and wireless connection while providing a reduced cost and reduced packaging space.

It is also contemplated that the PFC circuit 212, bulk capacitor 214, LF inverter circuit 216, and resonant circuit 218 of on-board charger 200 may be the same for the various charging voltages (e.g., 400-V and 800-V). On-board charger 200 may then be designed using a common PCB and package even when providing different output voltages.

It is further contemplated that the secondary windings 229, 230 of the DC-DC converter is magnetically decoupled from the primary coil 226 to achieve the same volt-amp stresses through the PFC circuit 212, bulk capacitor 214, LF inverter circuit 216, and resonant circuit 218. The DC-DC converter 228 may be designed to allow coupling between the primary coil 226 and each of the secondary windings 229, 230 while decoupling the flux path of the secondary windings 229, 230. The coupling between the primary coil 226 and each of the secondary windings 229, 230 may be accomplished by adjusting the cross-sectional area of the DC-DC converter 228. For instance, coupling may be $1/\sqrt{2}$ when the primary coil 226 and the secondary windings 229, 230 use the same cross-sectional area.

Figure 6A:
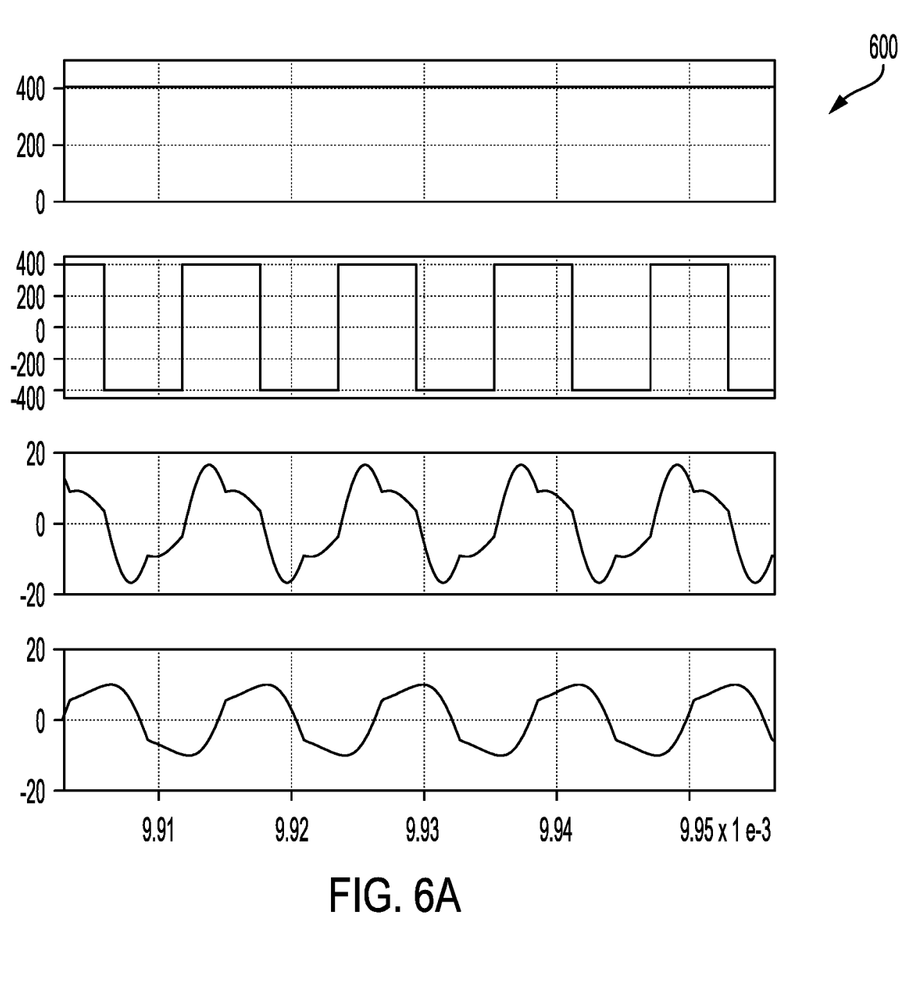
FIGS. 6A and 6B illustrate output waveform results while on-board charger is operating.
Figure 6B:
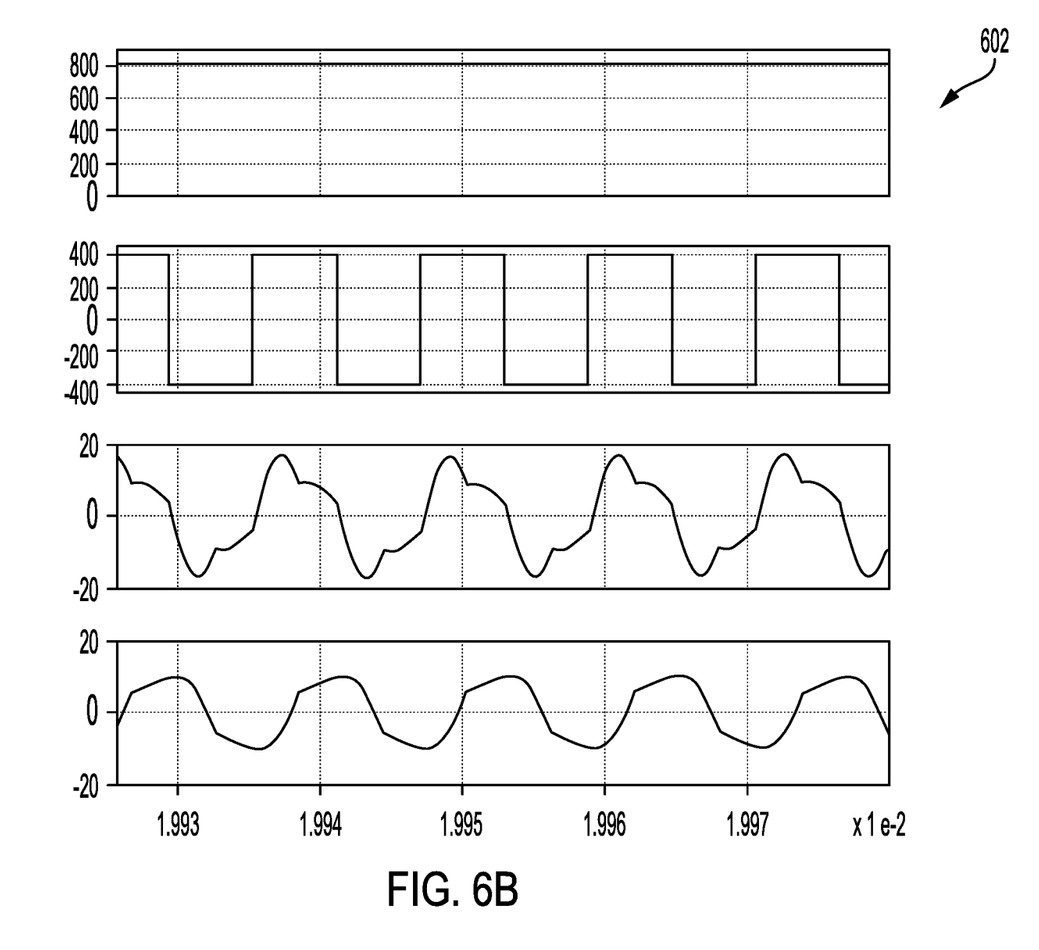

FIGS. 6A and 6B illustrate a first waveform result 600 for 400-Volt charging and a second waveform result 602 for 800-Volt charging. The first waveform result 600 and second waveform result 602 illustrates the output voltage and current of the LF inverter circuit 216 while conductive charging is being provided. The first waveform result 600 and second waveform result 602 illustrates that current is being provided (i.e., energizing) to receiving coil 224 even when receiving coil 224 is not being used for wireless charging. When energized during conductive power charging, the receiving coil 224 operates as part of resonant circuit 218.

Figure 7A:
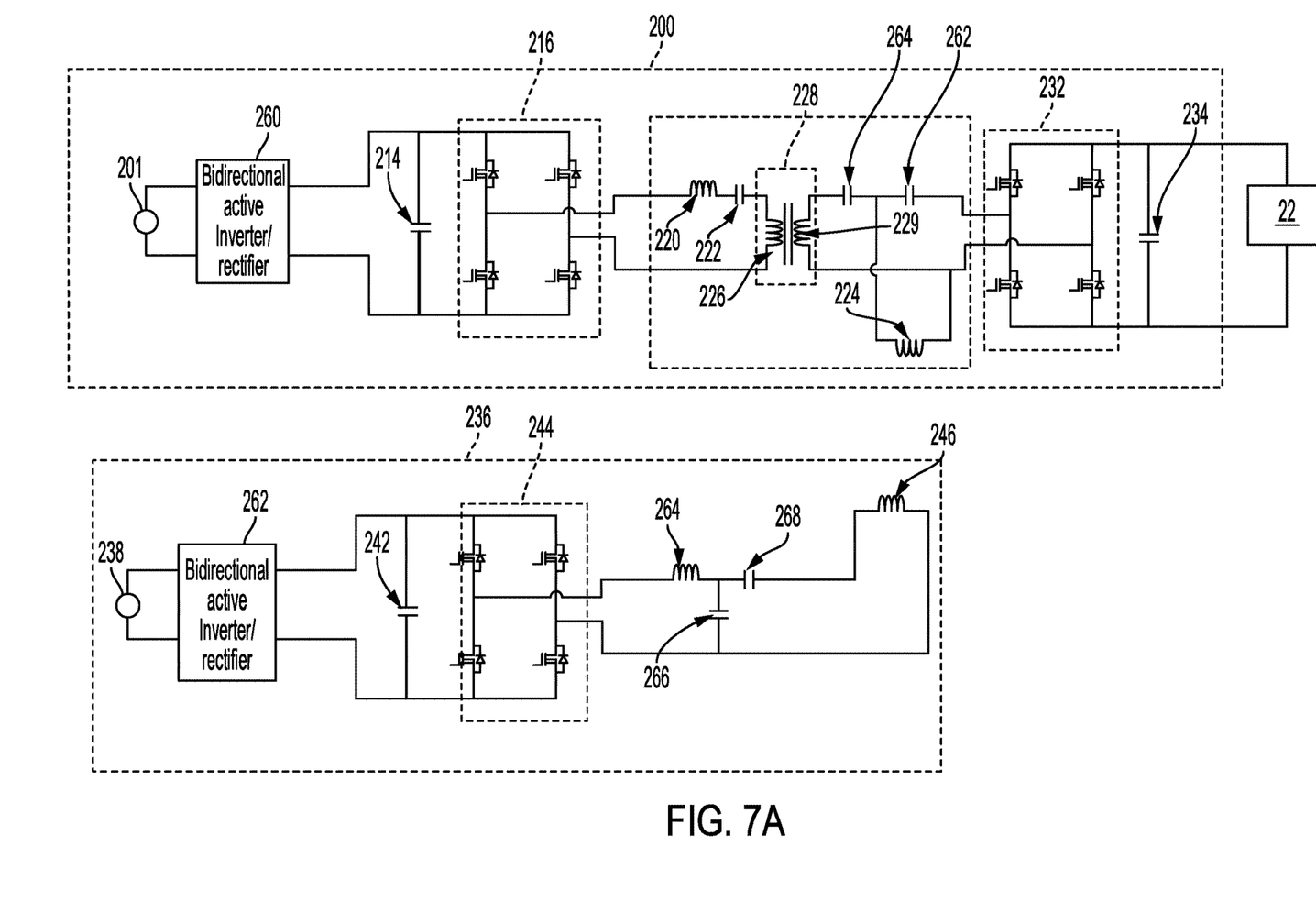
FIGS. 7A and 7B illustrate two alternative circuit designs for the exemplary on-board charger for the electric vehicle.

FIG. 7A illustrates an alternative embodiment for the on-board charger 200 and wireless power transfer unit 236 that is operable to provide both wired power charging and wireless power charging. As illustrated, the on-board charger 200 may receive conductive power from electrical source 201. The conductive power may then be processed using a bi-directional inverter/rectifier circuit 260, a bulk capacitor 214, a low-frequency (LF) inverter circuit 216, the resonant circuit 218, a DC-DC converter 228, a rectifier circuit 232, and smoothing capacitor 234.

Resonant circuit 218, however, may include an inductor 220 and capacitor 222 located on the primary coil 226 (i.e., primary winding) side of the DC-DC converter 228. Resonant circuit 218 may also include receiving coil 224 located on the secondary winding 229 side of the DC-DC converter 228. When receiving coil 224 is not being provided wireless charging power from the wireless power transfer unit 236, the receiver coil 224 may be used to provide impedance matching when the on-board charger 200 is being supplied the electrical power 201 from a conductive power source. It is also contemplated that by leveraging the large inductance of the receiver coil 224 to optimize the resonant circuit 218, the overall matching network size of the onboard charger may be reduced. It is also contemplated that the receiving coil 224 may be used to receive electrical power from the wireless power transfer unit 236 that is external to electric vehicle 10 when conductive power is not being supplied by electrical source 201. Resonant circuit 218 may also include capacitors 266, 268 that are split by receiving coil 224. It is contemplated that by moving the receiving coil 224 to the secondary coil 229 the bi-directional inverter/rectifier circuit 260, bulk capacitor 214, and low-frequency (LF) inverter circuit 216 are not operated when receiving coil 224 is being provided wireless charging power from the wireless power transfer unit 236.

Again, the wireless power transfer unit 236 may be external to the electric vehicle 10. The wireless power transfer unit 236 may be designed to receive electrical power 238 from an A/C power source, for example. The wireless power transfer unit 236 may then process the electrical power 238 using a bi-directional inverter/rectifier circuit 262, wireless bulk capacitor 242, and a wireless LF inverter circuit 244. A transmitter coil 246 may then wirelessly transfer power to receiving coil 224 to charge the battery 22. It is also contemplated that the wireless power transfer unit 236 may further included an inductor 264 and capacitors 266, 268.

Figure 7B:
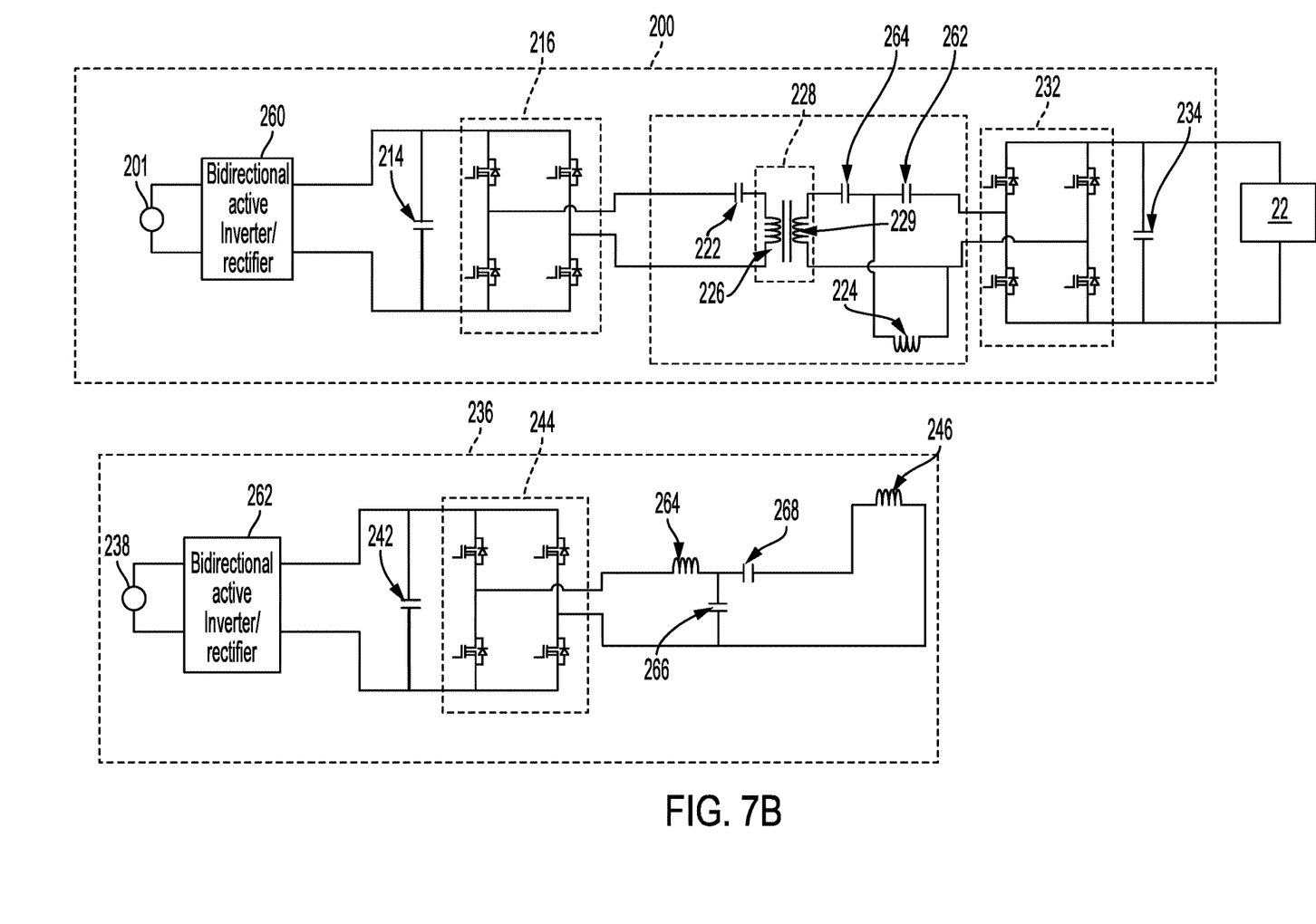

FIG. 8A illustrates another alternative embodiment for the on-board charger 200 and wireless power transfer unit 236 that is operable to provide both wired power charging and wireless power charging. It is contemplated that the DC-DC converter 228 may be designed as an integrated transformer such that inductor 220 shown in FIG. 7 may not be required. It is also contemplated that DC-DC converter 228 may be designed to have a coupling coefficient of less than one between the primary coil 226 and secondary winding 229.

As illustrated, the on-board charger 200 may receive conductive power from electrical source 201. The conductive power may then be processed using a bi-directional inverter/rectifier circuit 260, a bulk capacitor 214, a low-frequency (LF) inverter circuit 216, the resonant circuit 218, a DC-DC converter 228, a rectifier circuit 232, and smoothing capacitor 234.

It is again contemplated that the on-board charger 200 may be designed to support different charging voltages to the battery 22. And it is contemplated that the rectifier circuit 232 and smoothing capacitor 234 may be used to provide a constant DC-voltage (e.g., 400 Volts DC) of charging power to the battery 22.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A charger operable to provide wireless charging and wired charging to a battery of a vehicle, comprising:
   a wire-charging circuit including a power factor correction circuit, a capacitor, and an inverter, wherein the wire-charging circuit is operable to receive and process a first electrical energy from a wired power source directly connected to the vehicle;
   a resonant circuit, including a receiving coil and a DC-DC converter, the DC-DC converter including a primary winding, a first secondary winding, and a second secondary winding, wherein the receiving coil is energized to provide impedance matching when the wire-charging circuit is receiving and processing the first electrical energy from the wired power source, and wherein the receiving coil is energized by a wireless power source external to the vehicle to receive a second electrical energy when the resonant circuit is not receiving the first electrical energy from the wired power source; and
   a rectifier circuit parallelly connected to the first secondary winding and the second secondary winding, the rectifier circuit operable to provide DC charging voltage to the battery using the first electrical energy and the second electrical energy.

2. The charger of claim 1, wherein the receiving coil receives the second electrical energy from a wireless-transmission circuit that is external to the vehicle.

3. The charger of claim 2, wherein the wireless-transmission circuit comprises a second power factor correction circuit, a second capacitor, a second inverter, and a wireless transmitting coil, and wherein the wireless transmitting coil is operable to wirelessly transmit the second electrical energy to the wireless receiving coil.

4. The charger of claim 2, wherein the wireless-transmission circuit comprises at least one inductor and capacitor situated between a low-frequency inverter circuit and a wireless transmitting coil.

5. The charger of claim 1, wherein the rectifier circuit includes a first diode set and a second diode set that are mutually connected to a smoothing capacitor to provide 400-Volts of DC charging voltage to the battery.

6. The charger of claim 1, wherein the rectifier circuit includes a first diode set connected to a first smoothing capacitor and a second diode set connected to a second smoothing capacitor, and an output of the first smoothing capacitor and the second smoothing capacitor is operable to provide 800-Volts of DC charging voltage to the battery.

7. The charger of claim 1, wherein the first secondary winding and the second secondary winding are magnetically decoupled to provide uniform volt-amp stress across the wire-charging circuit.

8. The charger of claim 1, wherein the receiving coil is situated between the first secondary winding and the second secondary winding of the DC-DC converter and the rectifier circuit.

9. The charger of claim 8, wherein the DC-DC converter is an integrated transformer having a coupling coefficient that is approximately less than 1.

10. A method for providing wireless charging and wired charging to a battery of a vehicle, comprising:
    receiving a first electrical energy received from a wired power source directly connected to the vehicle;
    energizing a receiving coil to provide impedance matching for a resonant circuit when the first electrical energy is received from the wired power source;
    energizing the receiving coil by a wireless power source external to the vehicle to receive a second electrical energy when the resonant circuit is not receiving the first electrical energy from the wired power source; and
    converting the first electrical energy and the second electrical energy to a DC voltage appropriate for charging the battery using a DC-DC converter and a rectifier circuit, wherein the DC-DC converter includes a primary winding, a first secondary winding, and a second secondary winding, and wherein the rectifier circuit is parallelly connected to the first secondary winding and the second secondary winding, the rectifier circuit.

11. The method of claim 10, wherein the rectifier circuit includes a first diode set and a second diode set that are mutually connected to a smoothing capacitor to provide 400-Volts of DC charging voltage to the battery.

12. The method of claim 10, wherein the rectifier circuit includes a first diode set and a second diode set, wherein the first diode set is connected to a first smoothing capacitor and the second diode set is connected to a second smoothing capacitor, and an output of the first smoothing capacitor and the second smoothing capacitor provides 800-Volts of DC charging voltage to the battery.

13. The method of claim 10, wherein the receiving coil is situated between the first secondary winding and the second secondary winding of the DC-DC converter and the rectifier circuit.

14. A charger operable to provide wireless charging and wired charging to a battery of a vehicle, comprising:
    a wire-charging circuit including a power factor correction circuit, a capacitor, and an inverter, wherein the wire-charging circuit is operable to receive and process a first electrical energy from a wired power source directly connected to the vehicle;
    a resonant circuit, including a receiving coil and a DC-DC converter, the DC-DC converter including a primary winding, a first secondary winding, and a second secondary winding, wherein the receiving coil is energized to provide impedance matching when the wire-charging circuit is receiving and processing the first electrical energy from the wired power source, and wherein the receiving coil is energized by a wireless power source external to the vehicle to receive a second electrical energy when the resonant circuit is not receiving the first electrical energy from the wired power source;
    a rectifier circuit serially connected to the first secondary winding and the second secondary winding, the rectifier circuit to provide DC charging to the battery using the first electrical energy and the second electrical energy; and
    one or more switches operable to modify a configuration of the DC-DC converter and the rectifier circuit to provide different levels of charging voltages to the battery.

15. The charger of claim 14, wherein the rectifier circuit includes a first diode set and a second diode set that are mutually connected to a smoothing capacitor to provide 400-Volts of DC charging voltage to the battery.

16. The charger of claim 14, wherein the rectifier circuit includes a first diode set connected to a first smoothing capacitor and a second diode set connected to a second smoothing capacitor, and an output of the first smoothing capacitor and the second smoothing capacitor is operable to provide 800-Volts of DC charging voltage to the battery.

17. The charger of claim 14, wherein the first secondary winding and the second secondary winding are magnetically decoupled to provide uniform volt-amp stress across the wire-charging circuit.

18. The charger of claim 14, wherein the receiving coil is situated between the first secondary winding and the second secondary winding of the DC-DC converter and the rectifier circuit.

19. The charger of claim 18, wherein the DC-DC converter is an integrated transformer having a coupling coefficient that is approximately less than 1.

* * * * *